(12) United States Patent
Hsu

(10) Patent No.: US 7,727,616 B2
(45) Date of Patent: Jun. 1, 2010

(54) SCRATCH-RESISTANT THIN FILM

(75) Inventor: Lung-Lin Hsu, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 384 days.

(21) Appl. No.: 12/004,609

(22) Filed: Dec. 21, 2007

(65) Prior Publication Data

US 2008/0160255 A1 Jul. 3, 2008

(30) Foreign Application Priority Data

Dec. 29, 2006 (TW) ............... 95149982 A

(51) Int. Cl.
*E01F 9/04* (2006.01)
*G11B 5/64* (2006.01)
*B32B 3/00* (2006.01)
*B32B 5/16* (2006.01)
*B32B 17/10* (2006.01)

(52) U.S. Cl. .............. 428/141; 428/143; 428/156; 428/167; 428/323; 428/327; 428/409

(58) Field of Classification Search .......... 428/141, 428/143, 156, 157, 167, 323, 327, 409
See application file for complete search history.

(56) References Cited

U.S. PATENT DOCUMENTS

| 6,503,627 B1* | 1/2003 | Niimi et al. ............... 428/409 |
| 2006/0132922 A1* | 6/2006 | Takao et al. ............... 359/601 |
| 2006/0167126 A1* | 7/2006 | Goto et al. ............... 522/81 |

* cited by examiner

*Primary Examiner*—David R Sample
*Assistant Examiner*—Catherine Simone
(74) *Attorney, Agent, or Firm*—Ladas & Parry LLP

(57) ABSTRACT

The invention pertains to a scratch-resistant thin film comprising a transparent substrate wherein the substrate comprises at least one micro structured layer on the lower side and at least one scratch-resistant layer on the upper side, wherein said scratch-resistant layer has a convex-concave structure, a surface resistivity in the range from $10^8$ to $10^{12} \Omega/\square$, a pencil hardness of 3H or more as measured according to JIS K5400 standard method, and a haze in the range from 30% to 98% as measured according to JIS K7136 method.

The thin film of the invention exhibits both light enhancement and light uniformization properties, has a low volume shrinkage, does not warp, and possesses excellent anti-static and high hardness properties.

24 Claims, 2 Drawing Sheets

SCRATCH-RESISTANT THIN FILM

BACKGROUND OF THE INVENTION

1. Field of the Invention

The present invention relates to a scratch-resistant thin film with a cured coating, and more particularly, to an optical thin film applicable to the backlight module in a liquid crystal display (LCD).

2. Description of the Prior Art

Since a liquid crystal panel does not emit light itself, a backlight module, as a brightness source, is an important element for the displaying function of LCDs, and is very important for enhancing the brightness of LCDs. Presently, various optical films are used in the backlight module, and the use of such various optical films has become the most economical and convenient solution to enhance the brightness of an LCD panel to optimize the service efficiency of the light source without altering any element design or consuming additional energy. FIG. 1 is a schematic diagram of various optical films contained in a backlight module. As shown in FIG. 1, the optical films contained in a common backlight module include: a reflective film (1) disposed below the light guide plate (2); and other optical films disposed above the light guide plate (2), i.e., from the top to the bottom, a diffusion film (3), brightness enhancement films (4) and (5), and a protective diffusion film (6) in sequence.

In recent years, a new technique using a V-cut light guide plate has been developed in the field of backlight modules, which is a popular technology in the field of the backlight modules for the panels used in current notebook computers. The V-cut light guide plate is made mainly by directly microfabricating a prism on a light guide plate, and is used in the backlight module in combination with a prism sheet (reverse prism sheet) with downward serration, thereby replacing the two prism sheets with upward serration in conventional backlight modules. FIG. 2 is a schematic diagram of a backlight module having a V-cut light guide plate. As shown in FIG. 2, the V-cut technique mainly employs one reverse prism sheet (9), and one V-cut light guide plate (8) and one reflective film (7) under the reverse prism sheet, and additionally a diffusion film (10) above the reverse prism sheet (9). Compared with the conventional backlight module, the brightness of the backlight module having a V-cut light guide plate can be enhanced nearly by 30%, and thus the required power can be reduced by one third, which is considerably beneficial to the improvement on power-saving performance.

Technically, due to optical properties, the structure of the reverse prism sheet tends to generate bright-and-dark stripes, and the reverse prism sheet has a brightness uniformity of about 75%, which is lower than the 85% uniformity conventionally obtained. Therefore, there is a need for a technical solution to remove the stripes and reduce the warp of the film caused by an ultraviolet curable coating on a single side and the V-shaped structure of the film itself.

In view of the above, the present invention provides a scratch-resistant thin film to overcome the above-mentioned shortcomings. In the present invention, a novel hard coat solution is used to form a scratch-resistant layer on the surface of a substrate having an opposite micro structured layer on the other surface. After curing, the scratch-resistant layer can improve the hardness of the thin film, and has a certain extent of light-diffusing effect, that is, it has a haze of 30% to 98% as measured according to JIS K7136 standard method, thereby the problems associated with the bright-and-dark stripes and low brightness uniformity encountered by the reverse prism sheet can be solved effectively.

SUMMARY OF THE INVENTION

The present invention is directed to a scratch-resistant thin film comprising a transparent substrate, wherein the substrate comprises at least one micro structured layer on the lower side and at least one scratch-resistant layer on the upper side. The scratch-resistant layer has a surface resistivity in the range from $10^8$ to $10^{12} \Omega/\square$, a haze in the range from 30% to 98% as measured according to JIS K7136 standard method, and a pencil hardness of 3H or more as measured according to JIS K5400 standard method.

DETAILED DESCRIPTION OF THE INVENTION

Figure 1:
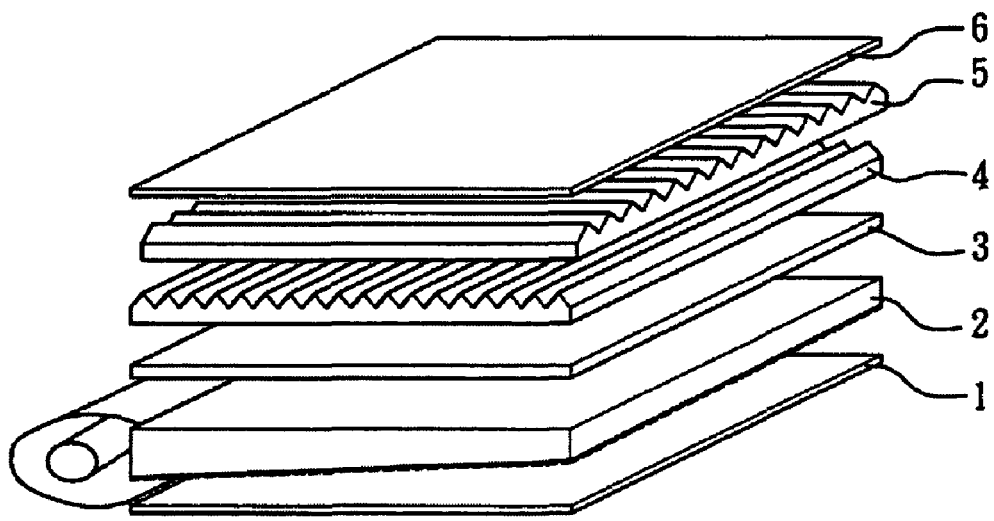
FIG. 1 is a schematic diagram of various optical films contained in a backlight module.

The substrate used in the scratch-resistant thin film of the present invention can be any kind of substrate known to those having ordinary skill in the art, such as glass or plastic. The plastic substrate is not particularly limited and includes, for example, but is not limited to, polyester resins, such as polyethylene terephthalate (PET) or polyethylene naphthalate (PEN); polyacrylate resins, such as polymethyl methacrylate (PMMA); polyimide resins; polycycloolefin resins; polycarbonate resins; polyurethane resins; triacetate cellulose (TAC); or a mixture thereof. The preferred substrates are those formed from polyethylene terephthalate, polymethyl methacrylate, polycycloolefin resin, or triacetate cellulose, or a mixture thereof. More preferably, the substrate is polyethylene terephthalate. The thickness of the substrate preferably is in the range from 16 μm to 300 μm, usually depending on the desired purpose of an optical product.

A commercially available film can be used as the transparent substrate of the present invention. For example, the commercially available transparent PET substrates that can be used in the present invention include, but are not limited to, U34® (trade name), produced by Toray Company; T680E® or T900E® (trade name), produced by Mitsubishi Company; A4300® (trade name), produced by Toyobo Company; KDDW® or KD84W® (trade name), produced by Teijin-Dupont (TDFJ) Company, Japan.

When a plastic substrate is used, a scratch-resistant layer is formed on a surface of the plastic substrate to enhance the hardness and avoid the scratch of the surface of the substrate, thereby achieving the scratch resistant effect. The scratch-resistant layer normally employed in the industry is typically comprised of an UV curing resin, which tends to warp as a result of non-uniform shrinkage and uneven stress caused by a cross-linking reaction, although superficial hardness is increased.

In order to solve the warp problem, in the present invention, a scratch-resistant layer is formed by coating a hard coat solution on a substrate followed by a heat and ultraviolet (UV) dual curing. According to the present invention, in addition to an anti-static agent and a UV curing resin, the hard coat solution also includes a thermal setting resin or a thermal plastic resin or a mixture thereof, of which a thermal setting resin is preferred. The obtained scratch-resistant layer has excellent heat resistance and extremely low volume shrinkage due to the high strength and good toughness of the thermal setting resin, thus overcoming the warp problem. Meanwhile, the scratch-resistant layer of the thin film of the present invention has the properties of good static resistance and high hardness, and has a surface resistivity in the range from $10^8$ to $10^{12}\Omega/\square$ ($\Omega/\square$ represents ohm/square), and a pencil hardness of 3H or more as measured according to JIS K5400 standard method.

In order to achieve a light diffusion effect, the scratch-resistant layer of the present invention is located at the upper side of the substrate (i.e., light-emitting surface) and has a fine convex-concave structure. The scratch-resistant layer of the thin film of the present invention has a haze in the range from 30% to 98%, preferably from 50% to 70%, as measured according to JIS K7136 standard method. The method for forming the scratch-resistant layer having a fine convex-concave structure is not particularly limited, and can be any one known to persons of ordinary skill in the art, which can be, for example, but is not limited to, screen printing, coating, embossing, and spray coating. The thickness of the scratch-resistant layer is preferably in the range from 3 μm to 20 μm, and more preferably from 5 μm to 15 μm.

According to the present invention, the scratch-resistant layer having a convex-concave structure can be formed preferably by coating a hard coat solution comprising an anti-static agent, a UV curing resin, organic particles, and at least a resin selected from the group consisting of thermal setting resins, thermal plastic resins, and a mixture thereof on a substrate. The shape of the organic particles is not particularly limited, and can be, for example, spherical, oval, or diamond-shaped. The species of the particles are also not particularly limited, which may be, for example, methacrylate resin or silicone resin or a mixture thereof, among which the methacrylate resin is preferred. The above-mentioned particles may be the same or different in diameter, which is preferably in the range from about 1 μm to about 20 μm. According to the present invention, the organic particles preferably are those with the same diameter, and more preferably are those with a same diameter in the range from about 2 μm to about 15 μm. The amount of the organic particles is from 1 to 300 wt %, preferably from 5 to 30 wt %, based on the total weight of the resin components in the hard coat solution.

The UV curing resin useful in the hard coat solution of the present invention contains at least one acrylate monomer having one or more functional groups. The acrylate monomers useful in the invention include, for example, but are not limited to, (meth)acrylate, urethane acrylate, or epoxy acrylate, among which (meth)acrylate is preferred. For example, the acrylate monomers useful in the invention are selected from the group consisting of methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl (meth)acrylate, isooctyl acrylate, stearyl(meth)acrylate, isodecyl acrylate, isobornyl(meth)acrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A di(meth)acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxyethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, di-trimethylolpropane tetraacrylate, propoxylated pentaerythritol tetraacrylate, pentaerythritol tetraacrylate, dipentaerythritol hexaacrylate, methacrylate, hydroxyethyl acrylate, 2-hydroxyethyl methacrylate, tripropylene glycol di(meth)acrylate, 1,4-butanediol di(meth)acrylate, 1,6-hexanediol di(meth)acrylate, allylated cyclohexyl di(meth)acrylate, isocyanurate di(meth)acrylate, ethoxylated trimethylol propane tri(meth)acrylate, propoxylated glycerol tri(meth)acrylate, trimethylol propane tri(meth)acrylate, and tris(acryloxyethyl) isocyanurate, and a mixture thereof.

In order to enhance the film-forming property of the hard coat solution, the UV curing resin of the present invention may optionally comprise an oligomer having a molecular weight in a range from $10^3$ to $10^4$. Such oligomers are well known to those skilled in the art, such as, acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homo-acrylates.

The thermal setting resin useful in the hard coat solution of the present invention typically has an average molecular weight in a range from $10^4$ to $2\times10^6$, preferably from $2\times10^4$ to $3\times10^5$, and more preferably from $4\times10^4$ to $10^5$. The thermal setting resin of the present invention can be selected from the group consisting of a polyester resin, a poly(meth)acrylate resin, and a mixture thereof, and is preferably a poly(meth)acrylate resin, such as polymethyl(meth)acrylate. In order to enhance the crosslinking, the thermal setting resin may optionally contain a hydroxyl group (—OH), a carboxy group (—COOH), or an amino group (—NH$_2$), preferably a hydroxyl group, such as hydroxyethyl acrylate (HEA), hydroxypropyl acrylate (HPA), 2-hydroxyethyl methacrylate (HEMA), or hydroxypropyl methacrylate (HPMA), or mixtures thereof.

The thermal plastic resin useful in the hard coat solution of the present invention can be selected from the group consisting of a polyolefin resin, such as polyethylene (PE) or polypropylene (PP); a poly(meth)acrylate resin, such as polymethyl methacrylate (PMMA); and a mixture thereof. The thermal plastic resin typically has an average molecular weight in the range from $10^4$ to $2\times10^6$, preferably from $2\times10^4$ to $3\times10^5$, and more preferably from $4\times10^4$ to $10^5$.

During the processing or fabrication of the resin material, static electricity will be generated by the friction of the resin materials themselves or between the resin materials and other materials, which makes the free dusts in the air are aggregated on the surface, resulting in the damage of the expensive electronic devices, and even causing a fire hazard due to the ignition of the combustible gas or powder. Therefore, it is necessary to add an anti-static agent to the resin materials.

The hard coat solution of the present invention is prepared by directly mixing the anti-static agent and the resin followed by mixing processing. The anti-static agents useful in the hard coat solution of the present invention are not particularly limited and are well known to the persons of ordinary skill in the art, which include, for example, ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like.

The hard coat solution of the present invention can optionally include an additive known to the persons of ordinary skill in the art, which includes, for example, but is not limited to, curing agent, photo initiator, leveling agent, dispersing agent, or stabilizing agent.

The curing agent useful in the present invention is well known to the persons of ordinary skill in the art, which allows the cross-linking to be formed by intermolecular chemical bond, and can be, for example, but is not limited to, diisocyanate or polyisocyanate.

The photo initiator used in the present invention will generate free radicals after being irradiated, and initiate a polymerization through delivering the free radicals. The photo initiator applicable to the present invention is not particularly limited, which is for example, but not limited to, benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, or 2,4,6-trimethylbenzoyl diphenyl phosphine oxide, or mixtures thereof. Preferably, the photo initiator is benzophenone or 1-hydroxy cyclohexyl phenyl ketone.

The scratch-resistant thin film of the present invention can be fabricated in any manner well known to persons of ordinary skill in the art, for example, by coating method and a roll-to-roll continuous process. Generally, the sequence of coating the scratch-resistant layer and the micro structured layer is not particularly limited. According to the present invention, it is preferred to coating the scratch-resistant layer on the substrate first, and then form the micro structured layer.

The fabrication manner of the present scratch-resistant layer is not particularly limited, and can be, for example, a coating process including the following steps:

(I) mixing a UV curing resin, a thermal setting resin, a thermal plastic resin, organic particles, a solvent, and an anti-static agent, and optionally a conventional additive to form a colloidal hard coat solution;

(II) coating the hard coat solution onto a surface of a transparent substrate to form a coating layer;

(III) putting the coated substrate into an oven to evaporate the solvent, and heating the substrate for several minutes at an elevated temperature above the curing point of the thermal setting resin to perform a thermal setting polymerization; and (IV) directly irradiating the coating with an energetic ray to initiate photo polymerization to form a scratch-resistant layer, wherein the intensity of the energetic ray can be in the range from 100 to 1000 mJ/cm$^2$, preferably from 200 to 800 mJ/cm$^2$.

If necessary, the above steps can be repeated to obtain a plurality of scratch-resistant layers.

Additionally, in the above Step (II), the coating method for coating the hard coat solution onto the substrate is well known to persons skilled in the art, which can be, for example, slit die coating, micro gravure coating, roller coating, or a combination thereof.

In order to achieve a brightness enhancing effect, the substrate coated with the scratch-resistant layer according to the present invention has at least one micro structured layer on the lower side (i.e., light incidence plane) as a brightness enhancement film. The micro structured layer is formed by coating a composition containing a UV curing resin monomer and a photo initiator on the substrate. The micro structured layer of the thin film of the present invention has a thickness preferably in the range from 10 μm to 100 μm, more preferably in the range from 20 μm to 80 μm, and most preferably in the range from 50 μm to 70 μm. The monomers useful for the UV curing resin are well known to persons of ordinary skill in the art, which may be, for example, the acrylate monomers having one or more functional groups used in the aforementioned hard coat solution, preferably a methacrylate, or reactive monomers having a high refractive index and containing an aromatic group, such as styrene, vinyl naphthalene, phenyl acrylate, or naphthalene acrylate. The useful photo initiator can be that for the above-mentioned hard coat solution. Moreover, the composition can optionally comprise any conventional additive, such as an inorganic filler, a leveling agent, an anti-foaming agent, or an anti-static agent.

The form of the micro structured layer of the present invention can be any of those well known to persons of ordinary skill in the art, such as regular or irregular prism pattern, rounded prism pattern, solid angle pattern, bead pattern, or lenticular or wave-like pattern, of which the regular or irregular prism pattern with an apex angle of 60° to 75° is preferred, and such a brightness enhancement layer will provide a better brightness enhancing effect, so as to enhance the brightness of the display. Additionally, the micro structured layer may have interlaced or non-interlaced prism structures with each other, and when two prism structures are interlaced with each other, the spacing between the adjacent prisms (i.e., the distance between the tips of the two prisms) is in the range from 0 to 100 μm, whereas when two prism structures are non-interlaced with each other, the spacing between the adjacent prisms is in the range from 1 to 100 μm.

The micro structured layer of the thin film of the present invention can be fabricated in any manner well known to persons of ordinary skill in the art. As described above, the sequence of coating the scratch-resistant layer and the micro structured layer is not particularly limited. A method for fabricating a micro structured layer on a substrate with a coated scratch-resistant layer will be illustrated by the following example, which, however, is not intended to serve as a limitation on the scope of the present invention. For example, the method for fabricating a micro structured layer on another side of the substrate that has been coated with a scratch-resistant layer on one side according to the method described above includes the following steps:

(I) mixing the components, such as a UV curing resin monomer and a photo initiator, and optionally a conventional additive to form a composition;

(II) coating the composition onto another surface of the substrate with a coated scratch-resistant layer on one surface to form a coating layer;

(III) pressing the coating layer with a V-cut mold to produce a coating layer with prism structures, and irradiating the layer with an energetic ray to initiate photo polymerization, wherein the intensity of the energetic ray may be in the range from 100 to 1000 mJ/cm$^2$, preferably from 200 to 800 mJ/cm$^2$; and (IV) releasing the film; and (V) optionally, after the Step (IV), directly irradiating the coating layer with the prism structures with an energetic ray again to initiate a photo-polymerization to completely cure the coating layer, wherein the intensity of the energetic ray can be in the range from 100 to 1000 mJ/cm$^2$, preferably from 200 to 800 mJ/cm$^2$.

In Step (II), the method for coating the composition on the substrate is well known to persons skilled in the art, which can be, for example, slit die coating, micro gravure coating, roller coating, or a combination thereof.

Additionally, since the scratch-resistant layer of the substrate has organic particles that will diffuse the light and the intensity of the energetic ray irradiating through the scratch-resistant layer of the substrate is reduced in Step (III), after Step (IV), Step (V) can optionally be performed to ensure the complete curing of the micro structured layer.

Figure 3:
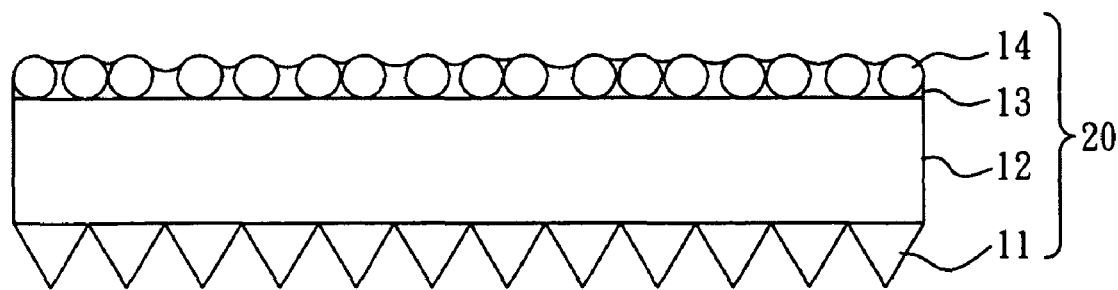
FIG. 3 is a schematic diagram of a scratch-resistant thin film according to one embodiment of the present invention.

FIG. 3 shows an embodiment of the scratch-resistant thin film (20) of the present invention, in which the transparent substrate (12) has a scratch-resistant layer (13) with a convex-concave structure and including organic particles (14) on the upper side and a micro structured layer (11) with a brightness enhancing function on the lower side.

Figure 2:
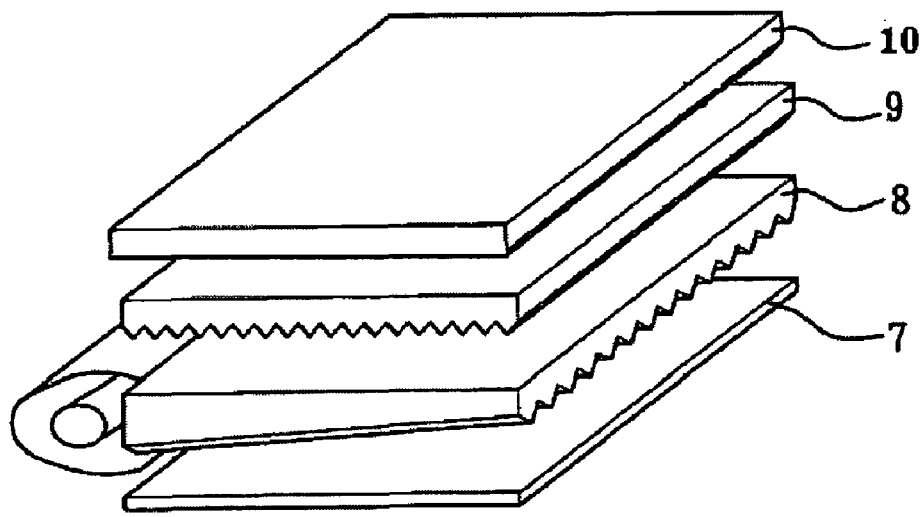
FIG. 2 is a schematic diagram of a V-cut backlight module.
Figure 4:
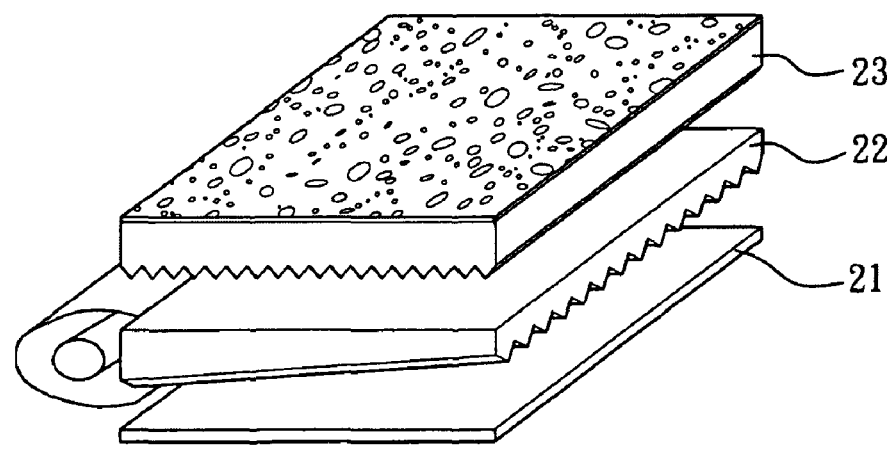
FIG. 4 is a schematic diagram of a backlight module having a V-cut light guide plate using the scratch-resistant thin film of the present invention.

The scratch-resistant thin film of the present invention is useful in a backlight module with a V-cut light guide plate, and is disposed above the light emitting plane of the V-cut light guide plate. Since the scratch-resistant thin film of the present invention has a scratch-resistant layer with a fine convex-concave structure on the substrate surface, the hardness can be improved effectively, so as to protect the contact means, and the surface of the film is flat without warp, so that the optical properties will not be influenced. Furthermore, the scratch-resistant thin film of the present invention provides both brightness enhancing and light diffusing effects, and can be used in the backlight module of a display as a substitute for both the reverse prism sheet and upper diffusion film. FIG. 4 is a schematic diagram showing the application of the scratch-resistant thin film of the present invention to a backlight module having a V-cut light guide plate. As shown in FIG. 4, a reflective film (21) is disposed under a V-cut light guide plate (22); and the scratch-resistant thin film (23) of the present invention is disposed above the V-cut light guide plate (22) as a substitute for the reverse prism film and upper diffusion film previously used in a conventional V-cut light guide (referring to FIG. 2).

The following examples are used to further illustrate the present invention, but not intended to limit the scope of the present invention. Any modifications or alterations that can easily be accomplished by persons skilled in the art fall within the scope of the disclosure of the specification and the appended claims.

EXAMPLES

Example 1

To a 250 mL glass bottle, the solvent: 22 g of toluene and 22 g of butanone was added. Under high speed stirring, 4.8 g of micro particles of acrylate resin with an average particle diameter of 10 μm (MX-1000, Soken Company); the following UV curing resin: 18 g in total of a monomer mixture of 2-hydroxyethyl methacrylate, methyl methacrylate, butyl acrylate, and pentaerythritol triacrylate; and the following thermal setting resin: 18 g of acrylate resin (Eterac 7363-ts-50, Eternal Company) (with a solids content of about 50%) were added sequentially, and then 2.0 g of a curing agent (Desmodur 3390, Bayer Company) (with a solids content of about 75%), 3.6 g of an anti-static agent (GMB-36M-AS, Marubishi Oil Chem. Co., Ltd) (with a solids content of about 20%), and the following photo initiator: 1 g in total of a mixture of benzophenone and 1-hydroxycyclohexyl phenyl ketone were added. Finally, about 95.2 g of a coating with a solids content of about 40% was obtained. The coating was coated on one surface of a transparent PET film (U34® (188 μm), Toray Company) with a RDS Bar Coater #12, dried for 1 minute at 100° C., and then dried by being exposed in a UV exposure machine (Fusion UV, F600V, 600 W/inch, H type lamp source) at a power set at 100% and at a speed of 15 m/min with an energetic ray of 200 mJ/cm$^2$, to afford a scratch-resistant layer with a coating thickness of about 12 μm. The resultant scratch-resistant optical film had a total film thickness of 200 μm. Moreover, as measured according to JIS K7136 standard method, the resultant optical film had a haze of 70% and a total light transmittance of 95%. The measurements for the film thickness, the haze, and the total light transmittance are described in detail in the following test methods.

To another 250 mL glass bottle, 100 g in total of a monomer mixture of 2-hydroxyethyl methacrylate, methyl methacrylate, butyl acrylate, and pentaerythritol triacrylate, and 5 g in total of the following photo initiator: a mixture of benzophenone and 1-hydroxycyclohexyl phenyl ketone were added. Finally, about 105 g of a coating with a solids content of about 100% was obtained. The coating was coated, with a RDS Bar Coater #30, onto another surface of the transparent PET film (U34® (188 μm), Toray Company) that had been coated with the scratch-resistant layer, pressed with a V-cut mold, and then cured by being exposed in a UV exposure machine (Fusion UV, F600V, 600 W/inch, H type lamp source) at a power set at 100% and at a speed of 10 m/min with an energetic ray of 250 mJ/cm$^2$, and released to afford a brightness enhancement layer with a coating thickness of about 50 μm. The resultant scratch-resistant thin film had a total film thickness of 250 μm and was tested for various properties as described below.

Comparative Example 1

The test for various properties was performed on a commercial available brightness enhancement film (Enplas Company) having a thickness of 250 μm.

Test Methods

Film Thickness Test: The film thickness of the sample to be tested was measured with a coating thickness gauge (PIM-100, TESA Corporation) under 1 N pressing contact.

Haze and Total Transmittance Test: According to JIS K7136 standard method, the test samples were measured for a haze (Hz) and total transmittance (Tt) with a NDH 5000W Haze Meter (Nippon Denshoku Industries Co., Ltd.).

Pencil Hardness Test: According to JIS K-5400 method, the test samples were tested with a Pencil Hardness Tester [Elcometer 3086, SCRATCH BOY], using Mitsubishi pencil (2H, 3H). The results of the test are shown in Table 1 below.

Surface Resistivity Test: The surface resistivity of the samples was measured according to ASTM D257 standard method with a Superinsulation Meter [EASTASIA TOADKK Co., SM8220&SME-8310, 500 V]. The testing conditions were: 23±2° C., 55±5% RH. The results of the test are shown in Table 1 below.

Scratch Resistance Test: A Linear Abraser [TABER 5750] was used, and a 3M BEF-III-10T film (20 mm length×20 mm width) was affixed on a 600 g platform (area: 20 mm length× 20 mm width). The test samples were tested for scratch resistance under pressure directly on the prismatic microstructure layer of the film. The scratch resistance test was performed in 10 cycles with a test path of 2 inch and a speed of 10 cycle/min. The results of the test are listed in Table 1 below.

Warp Test: The test samples were cut into level films with 100 mm length×100 mm width, placed in an oven at 120° C. for 10 min, and then taken out and left at room temperature. After being cooled down to the room temperature, the films were measured for warping level on the four corners with a gap gauge (recording unit: millimeter (mm), recording manner: for example, 0; 0; 0; 0), and thereby, the test samples were evaluated for heat-resistant and warp-resistant properties. The results of the test are listed in Table 1 below.

TABLE 1

| | Example 1 | Comparative Example 1 |
|---|---|---|
| Pencil Hardness of Scratch-Resistant Layer | 3H | 2H |
| Surface Resistivity of Scratch-Resistant Layer, Ω/Square | $5.6 \times 10^{11}$ | $2.4 \times 10^{15}$ |
| Scratch Resistance of Scratch-Resistant Layer | No Scratch | Scratched |
| Warp Test (mm) (120° C., 10 min) | 0; 0; 0; 0 | 0.2; 0.2; 0.2; 0.2 |

It can be seen from the results of the Example and Comparative Example that, the scratch-resistant optical film according to the invention possesses excellent anti-static and high hardness properties, and the surface thereof is level without warp, thereby avoiding the optical properties to be adversely affected.

I claim:

1. A scratch-resistant thin film comprising a transparent substrate, wherein the substrate comprises at least one micro structured layer on the lower side and at least one scratch-resistant layer on the upper side, and the scratch-resistant layer has a convex-concave structure, a surface resistivity in the range from $10^8$ to $10^{12} \Omega/\square$, a haze in the range from 30% to 98% as measured according to JIS K7136 standard method, and a pencil hardness of 3H or more as measured according to JIS K5400 method.

2. The thin film as claimed in claim 1, wherein the scratch-resistant layer is formed by coating a hard coat solution on the substrate followed by a heat and ultraviolet (UV) dual curing, wherein the hard coat solution comprises an anti-static agent, a UV curing resin, organic particles, and at least one resin selected from the group consisting of a thermal setting resin, a thermal plastic resin, and a mixture thereof.

3. The thin film as claimed in claim 1, wherein the scratch-resistant layer has a thickness in the range from 3 μm to 20 μm.

4. The thin film as claimed in claim 1, wherein the transparent substrate is plastic or glass.

5. The thin film as claimed in claim 2, wherein the organic particles are selected from the group consisting of methacrylate resins, silicone resins, and a mixture thereof.

6. The thin film as claimed in claim 2, wherein the organic particles have a diameter in the range from 1 μm to 20 μm.

7. The thin film as claimed in claim 5, wherein the organic particles have a diameter in the range from 2 μm to 15 μm.

8. The thin film as claimed in claim 2, wherein the amount of the organic particles is in the range from 1 to 300 wt % based on the total weight of the resin components in the hard coat solution.

9. The thin film as claimed in claim 2, wherein the anti-static agent is selected from ethoxy glycerin fatty acid esters, quaternary amine compounds, aliphatic amine derivatives, polyethylene oxide, siloxane, or alcohol derivatives.

10. The thin film as claimed in claim 2, wherein the UV curing resin comprises at least one acrylate monomer having one or more functional groups.

11. The thin film as claimed in claim 10, wherein the acrylate monomer is methacrylate, urethane acrylate, or epoxy acrylate.

12. The thin film as claimed in claim 10, wherein the UV curing resin further comprises an acrylate oligomer.

13. The thin film as claimed in claim 2, wherein the thermal setting resin is selected from the group consisting of a polyester resin, a polyacrylate resin, a polymethacrylate resin, and a mixture thereof.

14. The thin film as claimed in claim 2, wherein the thermal plastic resin is selected from the group consisting of a polyolefin resin, a polyacrylate resin, a polymethacrylate resin, and a mixture thereof.

15. The thin film as claimed in claim 2, wherein the hard coat solution further comprises an additive.

16. The thin film as claimed in claim 1, wherein the micro structured layer has a thickness in the range from 10 μm to 100 μm.

17. The thin film as claimed in claim 1, wherein the micro structured layer has a structure selected from the group consisting of regular or irregular prism pattern, rounded prism pattern, solid angle pattern, bead pattern, and lenticular and wave-like patterns.

18. The thin film as claimed in claim 17, wherein the micro structured layer has a regular or irregular prism pattern with an apex angle of 60° to 75°.

19. The thin film as claimed in claim 18, wherein the micro structured layer has interlaced or non-interlaced prism structures with each other.

20. The thin film as claimed in claim 19, wherein the micro structured layer has interlaced prism structures with each other, and the spacing between the adjacent prisms is in the range from 0 to 100 μm.

21. The thin film as claimed in claim 19, wherein the micro structured layer has non-interlaced structures with each other, and the spacing between the adjacent prisms is in the range from 1 to 100 μm.

22. The thin film as claimed in claim 1 for use in a backlight module of a display.

23. The thin film as claimed in claim 22, wherein the backlight module involves a V-cut light guide plate and the thin film is disposed above the light emitting plane of the V-cut light guide plate.

24. A display device comprising a backlight module having a V-cut light guide plate, wherein the backlight module has a thin film as claimed in claim 1 and disposed above the light emitting plane of the V-cut light guide plate.

* * * * *